(12) United States Patent
Ahn et al.

(10) Patent No.: US 7,653,856 B2
(45) Date of Patent: Jan. 26, 2010

(54) METHOD AND APPARATUS FOR TRANSMITTING ACKNOWLEDGEMENT SIGNALS

(75) Inventors: Joon Kui Ahn, Seoul (KR); Hyuck Chan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 11/546,404

(22) Filed: Oct. 12, 2006

(65) Prior Publication Data

US 2007/0024559 A1    Feb. 1, 2007

Related U.S. Application Data

(62) Division of application No. 10/334,782, filed on Jan. 2, 2003, now Pat. No. 7,143,330.

(30) Foreign Application Priority Data

Jan. 5, 2002    (KR) .................... 568/2002

(51) Int. Cl.
*H04L 1/18*    (2006.01)
(52) U.S. Cl. ..................................... 714/748
(58) Field of Classification Search ................ 714/748, 714/749, 776, 750
See application file for complete search history.

(56) References Cited

U.S. PATENT DOCUMENTS

| 5,828,677 | A | 10/1998 | Sayeed et al. ............ 371/41 |
| 5,946,320 | A | 8/1999 | Decker ..................... 370/428 |
| 6,058,106 | A | 5/2000 | Cudak et al. ............. 370/313 |
| 6,606,313 | B1* | 8/2003 | Dahlman et al. ........... 370/347 |
| 6,871,078 | B2 | 3/2005 | Nishioka .................. 455/522 |
| 7,324,785 | B2* | 1/2008 | Hansen et al. ............. 455/69 |
| 2001/0011023 | A1 | 8/2001 | Nishioka et al. ........... 455/522 |
| 2003/0099211 | A1 | 5/2003 | Moulsley et al. .......... 370/328 |

FOREIGN PATENT DOCUMENTS

| JP | 61-154240 | 7/1986 |
| JP | 2001-069079 | 3/2001 |
| JP | 2003-537216 | 3/2005 |
| WO | WO 01/78291 A2 | 10/2001 |
| WO | WO 03/034611 A2 | 4/2003 |

OTHER PUBLICATIONS

WO9967968, Hopkinson, Method of Assigning a Traffic Channel in a Communications System, and Control Unit for Same, Publication date: Dec. 29, 1999.*

(Continued)

*Primary Examiner*—James C Kerveros
(74) *Attorney, Agent, or Firm*—KED & Associates, LLP

(57) ABSTRACT

The present invention relates to a power controlling method in a mobile radio communication system using Automatic Repeat reQuest (ARQ) scheme, and more particularly to a power controlling method of response (ACK/NACK) signals for transmitting the ACK/NACK signals in different power based on the permissible probabilities of reception error that the system requires. When the ACK/NACK signals are transmitted and received in the automatic repeat request (ARQ) system, since the ACK/NACK signals can be transmitted in accordance with the transmission power satisfying an error rate required in each signal by differentiating the transmission power of the signal according to each ACK/NACK, the power consumption required in the transmission of the ACK/NACK signals can be reduced.

6 Claims, 3 Drawing Sheets

OTHER PUBLICATIONS

Chulajata, Tatcha and Hyuck M. Kwon, "Combination of Power Controls for cdma2000 Wireless Communications System"; IEEE, Sep. 28, 2000.

Rashid-Farrokhi, F., et al. "Joint Power Control and Beamforming for Capacity Improvement in Wireless Networks with Antenna Arrays"; IEEE, Nov. 1996.

Korean Office Action dated Feb. 14, 2008.

Philips; "Performance of ACK/NACK Signalling"; TSG RAN WG1 #22; TSGR (01)1198; Jeju, South Korea, Nov. 19-23, 2001 <http://www.3gpp.org/ftp/tsg_ran/WG1_RL1/TSGR1_22/Docs/Zips/R1-01-1198.zip>.

Philips; "Power Requirements of ACK/NACK Signalling"; TSG RAN WG1 ad hoc; TSGR (01)1058; Sophia Antipolis, France, Nov. 5-7, 2001 <http://www.3gpp.org/ftp/tsg_ran/WG1_RL1/TSGR1_AH/HSDPA_Ad_Hoc/Docs/Zips/R1-01-1058.zip>.

Muckenhein, J. et al.; "Construction of High-Efficient Optical CDMA Computer Networks: Statistical Design"; IEEE International Conference on Communications; Atlanta, Georga, Jun. 1998, pp. 1289-1293.

Japanese Office Action dated Jun. 11, 2008.

Fontolliet, Pierre-Girard, "Telecommunication Systems," 1986, Artech House, Inc., Dedham, MA, p. 353, XP002231295.

Perkins, Michael G., "Optimizing Signal Constellations for the Output of a Quantizer," Communications Technology for the 1990's and Beyond, Dallas, TX, IEEE Telecommunications Conference and Exhibition, New York, NY, Nov. 27, 1989, vol. 3, pp. 1895-1900, XP000091276.

Lüke, Dr. Ing. Hans Dieter; Chapter 6.4.4—"Signalubertragung"; 4th Volume; Springer-Verlag; Berlin, Heidelberg; 1990.

Schulist, Matthias; "Acknowledgment of 3GPP WCDMA Random and Packet Access; Applying Space-Time Transmit Diversity"; IEEE VTS 53rd Vehicular Technology Conference 2001; vol. 4; pp. 2519-2523; Greece 2001.

3GPP Physical Layer Standard for cdma2000 Spread Spectrum Systems, Release A, Addendum 1, 3GPP2C.S0002-A-1; Sep. 12, 2000.

Rapporteur; TR 25.858 v 1.0.0, Dec. 2001; $3^{rd}$ Generation Partnership Project; Technical Specification Group Radio Access Network; High Speed Downlink Packet Access; Physical Layer Aspects (Release 5); 3GPP TSG RAN #14, Dec. 11-14, 2001, Kyoto Japan; RP-01-0823.

Japanese Office Action dated Feb. 20, 2009.

Japanese Notice of Allowance dated Jul. 21, 2009.

* cited by examiner

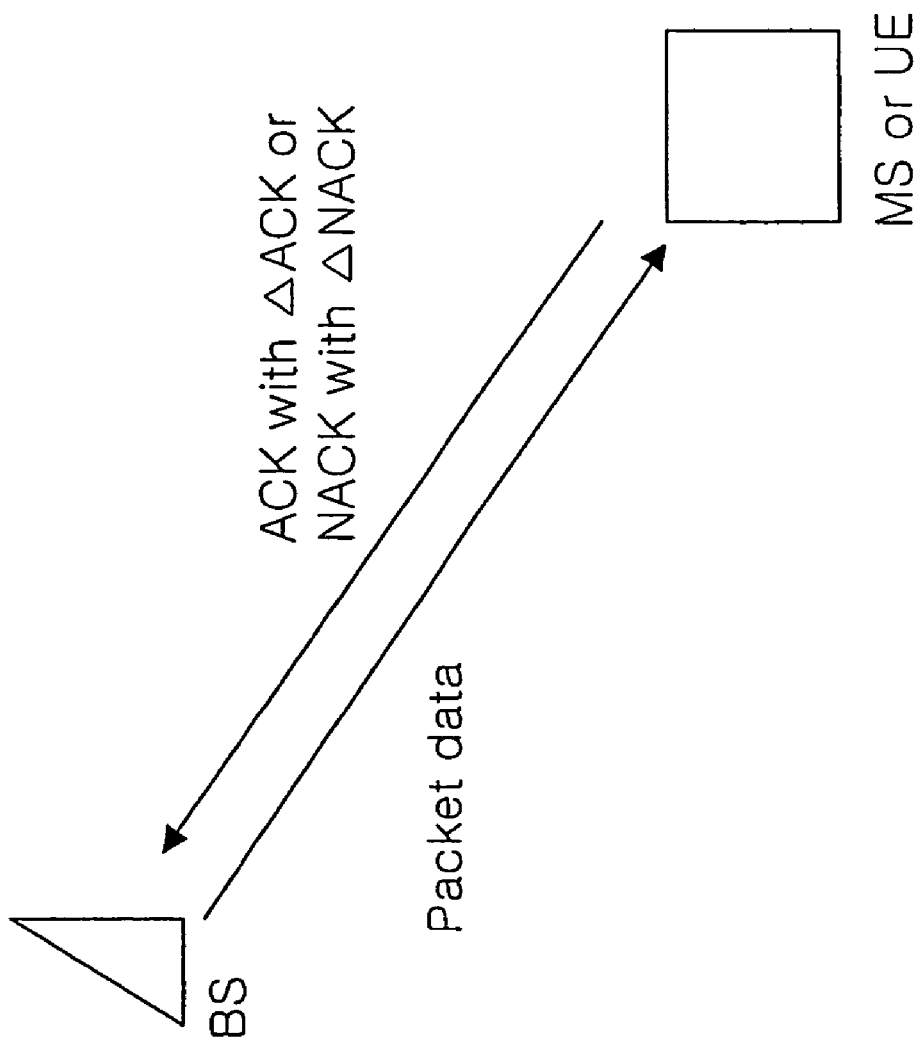

METHOD AND APPARATUS FOR TRANSMITTING ACKNOWLEDGEMENT SIGNALS

CROSS-REFERENCE TO RELATED APPLICATIONS

This application is a Divisional Application of prior U.S. patent application Ser. No. 10/334,782 filed on Jan. 2, 2003, now U.S. Pat. No. 7,143,330, issued Nov. 11, 2006, which claims priority under 35 U.S.C. §119 to Korean Application No. 568/2002 filed on Jan. 5, 2002, whose entire disclosure is hereby incorporated by reference.

BACKGROUND OF THE INVENTION

1. Field of the Invention

The present invention relates to acknowledgement signals, and more particularly, acknowledgment signals in mobile communication.

2. Background of the Related Art

Mobile radio channels are often characterized by the unpredictability of the channel due to, inter alia, Rayleigh fading and long term shadow fading. The channel quality may degrade as a result of several factors such as, for example, co-channel interference, adjacent channel interference, propagation path loss, and multi-path propagation (i.e., rayleigh fading). Transmission errors typically occur in bursts when fading causes the signal level to go below the noise or interference level. Therefore, explicit measures often need to be taken to maintain an acceptable level of quality of the transmission over a radio channel.

The quality of the transmission over a radio channel connection may be measured by the reliability with which the receiver receives the transmitted data. This channel reliability may, for example, be defined in terms of the bit-error-rate (BER) experienced at the receiver.

Specifically, forward error correction (FEC) and automatic repeat request (ARQ) are two well-known error control techniques commonly used for noisy and fading channels. In a system that uses FEC for error control, for example, the transmitter encodes the data using a given redundancy code, while the receiver, which has been informed of the code used, decodes the data at the receiving end. Many such systems using conventional block or convolutional codes have been explored and/or employed.

In a system that uses ARQ, the receiver returns (i.e., transmits back to the transmitter) an acknowledgement which indicates whether the given transmitted packet was received free of errors (in which case an acknowledgement signal, or "ACK" is sent), or whether it was received erroneously (in which case a negative acknowledgement signal, or "NACK" is sent). If the packet was not received error-free (i.e., if the transmitter receives back a "NACK" signal), the transmitter then retransmits the same packet again, anticipating that the packet will be successfully received on this (or else on a further, subsequent) transmission.

Transmission of multimedia applications such as high quality audio, images and real-time video, for example, require very low bit-error-rates, typically $10^{-6}$ or less. Obtaining such low BERs in wireless environments is challenging, even in the presence of very low rate forward error correction codes.

ARQ techniques, however, provide very reliable communication, albeit at the expense of variable and sometimes large delays. But hybrid ARQ schemes, in which both FEC and ARQ techniques are employed simultaneously, are particularly attractive because they combine the fixed delay error correction capability of FEC techniques with the low BER of basic ARQ schemes.

Though several ARQ schemes are utilized, the ACK or NACK signal should be transmitted from the receiver to the transmitter. Usually, one bit signal is used for the ACK signal or the NACK signal. In other word, the transmitter recognizes that the transmitted packet is received by the receiver in correct when the receiver transmits an ACK signal of one bit (for example 1 (one)), and recognizes that the packet is not received correctly by the receiver and retransmits a corresponding data packet when the receiver transmits a one bit NACK signal (for example –1 (minus one)).

A system using a High Speed Downlink Packet Access (hereinafter referred to HSDPA) of UMTS of an IMT-2000 standard of Europe defines that user equipment transmits an uplink ACK/NACK signal of 1 (one) bit for a downlink data packet transmission of a base station (Node B).

In a mobile radio communication system that uses packet type data transmission scheme such as above system, the ACK/NACK signal transmitted by the receiver is designed to be transmitted in a high power and energy without any specific protection such as channel coding for the purpose of rapid recognition of the acknowledgement. For example, the HSDPA system that is presently under standardization defines that the user equipment should transmit 1 (one) bit ACK/NACK signal without channel coding through the uplink so that the transmitter may be informed whether the corresponding data packet was received or not.

FIG. 1 illustrates how the background art receiver utilizes the one bit to transmit the response signals, which are complementary. The threshold power level is moved to the direction of ACK determination region from 0- at the transmitter which receives the acknowledgment signal from the receiver, for the transmitter to determine (DTX: discontinuous transmission, that is, no acknowledgement is transmitted) as NACK. However, in the receiver, the actual transmission power for the NACK signal is substantially same as the actually transmission power for the ACK signal in absolute power level (ΔA).

Since the receiver (for example, the user equipment using High Speed Downlink Packet Access scheme (hereinafter referred to as HSDPA)) uses one bit to transmit the ACK/NACK signal, the actual transmission power level for the one bit is intentionally set at high power and energy for the purpose of rapid recognition of the data packet acknowledgment.

In this particular case, the actual transmission power of the ACK signal is substantially equal to the required power such that there is a ΔA power difference relative to 0. Similarly, the actual transmission power of the NACK signal is substantially equal in opposite polarity with the ΔA power difference relative to 0. The power level is a relative value from the reference value of the radio channel floating according to the channel condition.

Though the transmitter transmits a data packet to the receiver, such a case may occur that the receiver does not send any acknowledgement (ACK/NACK signal) because it did not detect the existence of data packet to be received.

In this case (DTX: Discontinuous Transmission), if a system is designed to assume that the data packet is received or not within a specific time period after the transmitter transmits the data packet and the receiver did not send any acknowledgement (ACK or NACK signal) within the time period, and if the threshold power level is 0 at the transmitter, the transmitter is forced to determine the absence of acknowledgement to be one of the ACK signal or the NACK signal.

If no response (DTX) is determined as the ACK signal, the transmitter considers that the receiver has received the corresponding data packet in correct and transmits the next data packet, so that there occurs a data loss. To prevent the data loss, the transmitter should consider the DTX case as the case that the NACK signal is received. To achieve this, a threshold for determining whether the ACK/NACK signals are received may be shifted to a polarity of the ACK signal, as shown in FIG. 1.

In a fading radio channel circumstance of a radio communication system, the possibility of determining error of the acknowledgement signal such that the ACK signal transmitted from the receiver is determined as the NACK signal (ACK_NACK error) or the NACK signal is determined as the ACK signal (NACK_ACK error) may be greater than that of a wired channel circumstance of a wire-line communication system. The effects of the two types of errors to the system performance are not same to each other. So, the acceptable possibilities of the determining error are being defined in the course of standardization of HSDPA. Unfortunately, the background system inefficiently uses the same transmitting power for both the ACK signal and the NACK signal.

SUMMARY OF THE INVENTION

An object of the invention is to solve at least the above problems and/or disadvantages and to provide at least the advantages described hereinafter.

Therefore, the present invention is made to overcome the drawbacks of the background art and efficiently perform power control in the system using Automatic Repeat reQuest (ARQ) scheme, it is an object of the present invention to provide a power controlling method of response (ACK/NACK) signals for transmitting the ACK/NACK signals in different power based on the permissible probabilities of reception error that the system requires.

Accordingly, for the purpose of decreasing the power consumption required in the transmission of the ACK/NACK signals by a data receiving section, the present invention suggests a method of adjusting the transmission power of a NACK signal different from a transmission power of an ACK signal when the acknowledgement signals are transmitted.

According to an aspect of the present invention, the response signal comprises information of being received (ACK) and information of not being received (NACK), and a transmission power of a signal with respect to the information of not being received is smaller than a transmission power of a signal with respect to the information of being received.

According to another aspect of the present invention, a level of the transmission power of the signal with respect to the information of not being received is a level of a transmission power corresponding to an error rate limit required by the system.

According to another aspect of the present invention, the transmission power of the signal with respect to the information of not being received is smaller than half of the transmission power of the signal with respect to the information of being received.

The object and advantages of the present invention can be achieved in whole or in part by a method of transmitting at least one acknowledgement signal using automatic repeat request (ARQ), including: transmitting a first acknowledgement signal with a first prescribe power level difference from a reference power level, and transmitting a second acknowledgement signal with a second prescribed power level difference from the reference power level, wherein the first prescribed power level difference and the second prescribed power level difference are different from each other.

The object and advantages of the present invention can be achieved in whole or in part by an apparatus including: means for receiving data, means for transmitting an ACK signal having a first power level, and means for transmitting a NACK signal having a second power level, wherein the second level is not based on the first level.

The object and advantages of the present invention can be achieved in whole or in part by a method of avoiding error in a device using an ACK signal and a NACK signal based on automatic repeat request, including: determining a required ACK signal power level to avoid a probability of erroneous determination of the ACK signal as the NACK signal, determining an actual ACK transmission power of the device based on the required ACK power level, determining a required NACK signal power level to avoid a probability of erroneous determination of the NACK signal as the ACK signal, and determining an actual NACK transmission power of the device, wherein the actual NACK transmission power is independent of the actual ACK transmission power.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a schematic view of the system using the preferred embodiment of the present invention.

DETAILED DESCRIPTION OF PREFERRED EMBODIMENTS

Figure 1:
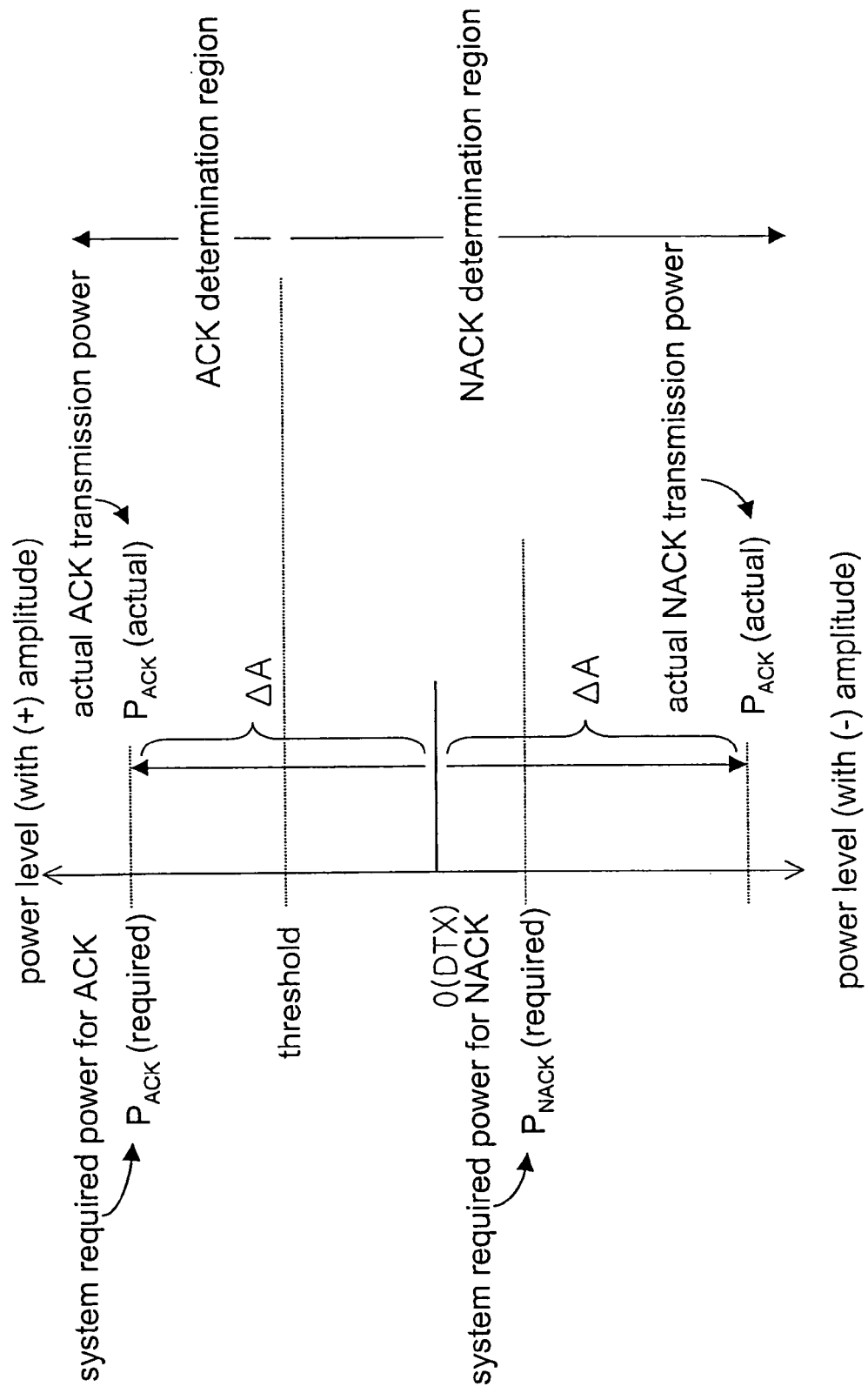
FIG. 1 is a schematic view illustrating a signal level and a determination threshold of ACK/ACK signals according to the background art.

In order to enhance efficiency, the error rate of the ACK_NACK required in the system is designed to be different from the error rate of the NACK_ACK error. Further, it should be designed to limit the error that the transmitter determines that the ACK signal is transmitted though the receiver did not send any one of the ACK or NACK signal. (DTX_ACK error) In addition, the transmission power of the acknowledgement signal should be adjusted according to the permissible error probability. Further, there is a need to increase the quality of a wireless transmission without substantially decreasing the overall throughput of the communication channels.

The following three errors can occur when a receiver transmits ACK/NACK signals to a transmitter after the transmitter transmits a data packet to the receiver:

1. The transmitter determines reception of a NACK signal even though the receiver transmitted an ACK signal as a response signal (hereinafter referred to ACK_NACK error) after the receiver receives the data packet;
2. The transmitter determines reception of an ACK signal even though the receiver transmitted a NACK signal as a response signal (hereinafter referred to NACK_ACK error) after the receiver receives the data packet; or 3. The transmitter determines no-response (DTX) from the receiver as an ACK signal due to error in a channel even though the receiver does not transmit a response signal (hereinafter referred to DTX_ACK error).

When the ACK_NACK error occurs, the transmitter retransmits the data packet, and the receiver simply discards the retransmitted data packet. Hence, the effect to the system by the ACK_NACK error is relatively minor.

However, when the NACK_ACK error occurs, the transmitter determines that the data packet is properly transmitted and transmits the next data packet even though the receiver did not receive the previous data packet. When the next data packet is received, the receiver transmits the NACK signal, and data loss occurs since the previous data packet was not properly received and the transmitter did not retransmit the previous data packet. Therefore, the probability of the occurrence of the NACK_ACK error must be limited to a low probability.

When the DTX_ACK error occurs, the transmitter determines that the receiver has properly received the transmitted data packet even though the receiver did not detect the fact that the transmitter transmitted the data packet. Hence, the data is lost similar to the NACK_ACK error. Therefore, if the response signal (NACK) is not transmitted, the transmitter must determine the no-response as the NACK signal for retransmission of the data packet. However, since the DTX_ACK error is a complex case considered only that the receiver can not detect the transmission of the data packet, the restrictions required by systems are varied.

For example, if a system restricts the probability of occurrence of the ACK_NACK error to be below $10^{-3}$, the probability of occurrence of the NACK_ACK error to be below $10^{-4}$, and the probability of occurrence of the DTX_ACK error to be below $10^{-3}$, the required transmission power of a response signal when the response signal is an ACK signal, the required transmission power of a response signal when the response signal is a NACK signal, and the threshold power for determining the response signal (whether a response signal falls within an ACK determination region or a NAK determination region) are obtained based on the following procedures:

1. To obtain the threshold power level for deciding the response signal between ACK and NACK in which the probability of DTX_ACK error is below $10^{-3}$.
2. To obtain the required transmission power for ACK, $P_{ACK}$ (required), in which the probability of an ACK_NACK error is below $10^{-3}$ based on the threshold power level for deciding the response signal obtained in (1) above.
3. To obtain the required transmission power for NACK, $P_{NACK}$ (required), in which the probability of an NACK_ACK error is below $10^{-4}$ in view of the threshold power level for deciding the response signal obtained in (1) above.

The threshold power level and the transmission power levels are relative powers to a reference transmission power of the radio channel between the receiver and the transmitter. And, the reference transmission power of the radio channel is floating according to the channel condition. Hence, the power levels are preferably expressed in the unit of dB.

Figure 2:
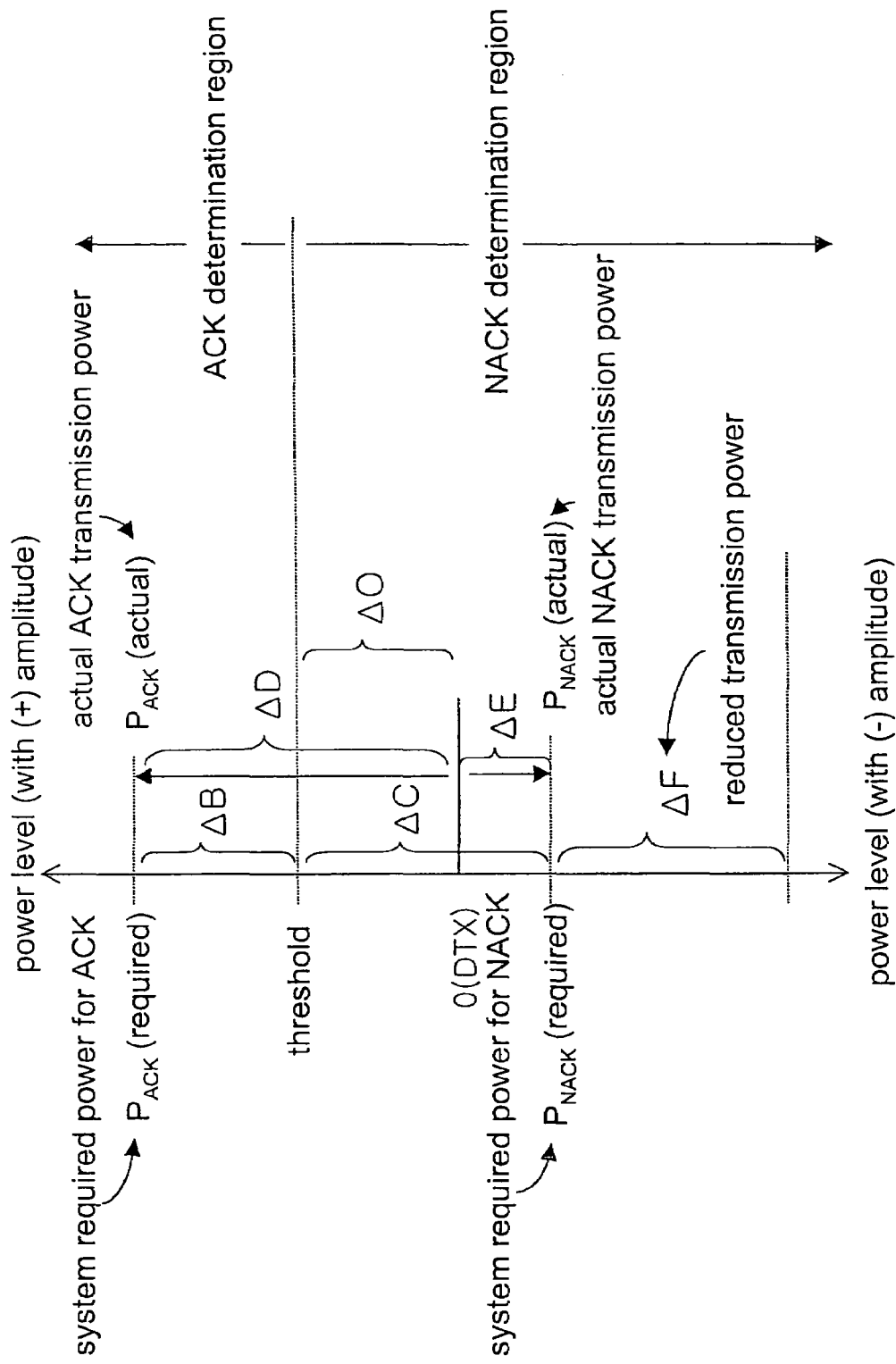
FIG. 2 is a schematic view illustrating a signal level and a determination threshold of ACK/ACK signals according to a preferred embodiment of the present invention.

As suggested in the preferred embodiment of the present invention, the transmission power of the response signal is adjusted differently according to whether the response signal is an ACK signal or a NACK signal, as shown in FIG. 2. In actual transmission of the response signal, the response signal can be transmitted by adjusting the transmission power of the response signal in accordance with the transmission power $P_{ACK}$ obtained in (2) above when the response signal is the ACK, or the transmission power $P_{NACK}$ obtained in (3) above when the response signal is the NACK.

With reference to FIG. 2, the preferred embodiment of the present invention is explained more detail. In order to satisfy the probability of the DTX_ACK error in actual wireless packet communication system, the ACK/NACK determination threshold is adjusted by ΔO relative to 0. Thereafter, based on the probability of ACK_NACK error, the required power $P_{ACK}$ (required), for the ACK signal is determined which has a power difference ΔB relative to ΔO or relative to the threshold power level. Likewise, the required power, $P_{NACK}$ (required), which has a power difference ΔC relative to ΔO or relative to the threshold power level. In this particular example, actual DTX occurrence is shown to occur at 0 power level.

Thereafter, the actual ACK transmission power $P_{ACK}$ (actual) is set to be about substantially the same as the required power for the ACK signal and has a ΔD relative to 0 or relative to DTX occurrence. As shown in this example, ΔB is less than ΔD.

In the background art, the actual NACK transmission power is set to have a ΔD relative to 0 or relative to DTX occurrence. In this preferred embodiment the actual NACK transmission power $P_{NACK}$ has a ΔE relative to 0 or relative to DTX occurrence. In this case, the power consumption for the transmission of the NACK signal can be reduced at larger amount by transmitting the response signal according to the required transmission power $P_{NACK}$ as shown in FIG. 2 when the response signal is the NACK. The amount of power reduction is ΔF.

Considering a specific IMT-2000 HSDPA system employment as an example, if a system requires to restrict the probability of occurrence of the ACK_NACK error below $10^{-2}$ (Prob{erroneous decoding of ACK to NACK}<$10^{-2}$), the probability of occurrence of the NACK_ACK error below $10^{-4}$ (Prob{erroneous decoding of NACK to ACK}<$10^{-4}$), and the probability of occurrence of the DTX_ACK error below a certain value (Prob{erroneous decoding of DTX to ACK }<TBD ), the transmission power of a response signal when the response signal is the ACK, the transmission power of a response signal when the response signal is the NACK, and the threshold for determining the response signal are obtained as follows:

1. Determine an ACK/NACK decision/determination threshold that satisfies the requirement on the Prob{erroneous decoding of DTX to ACK}.
2. Determine an ACK TX power that satisfies the requirement on the Prob{erroneous decoding of ACK to NACK} based on the decision/determination threshold.
3. Determine a NACK TX power that satisfies the requirement on the Prob{erroneous decoding of NACK to ACK} based on the decision/determination threshold.

Table 1 shows the power requirements of ACK and NACK signals with Prob{erroneous decoding of ACK to NACK}<$10^{-2}$, Prob{erroneous decoding of NACK to ACK}<$10^{-4}$, and various restrictions on the Prob{erroneous decoding of DTX to ACK}. To obtain these results, the following assumptions are made:

1. 2 GHz carrier frequency;
2. Rayleigh fading, 2 equal gain paths;
3. Ideal UL SIR & channel estimation;
4. UE speed is 3 km/hr;
5. 4% error rate on DL TPC command;
6. UL DPCCH is power controlled to meet 4% error rate on UL TPC command;

7. Power control step size is 1 dB; and
8. UL Interference has AWGN property.

TABLE 1

Power requirements in the ACK/NACK transmission

| Prob{erroneous decoding of DTX to ACK} | $<10^{-1}$ | $<10^{-2}$ | $<10^{-3}$ |
|---|---|---|---|
| Threshold to Interference ratio relative to the average UL DPCCH power | −0.5 dB | 4.5 dB | 7 dB |
| ACK TX power relative to UL DPCCH | −0.5 dB | 2 dB | 3 dB |
| NACK TX power relative to UL DPCCH | −4 dB | −9 dB | −16.5 dB |
| ACK TX power − NACK TX power | 3.5 dB | 11 dB | 19.5 dB |

As shown, the difference in the power requirements varies greatly from 3.5 dB to 19.5 dB according to the required Prob{erroneous decoding of DTX to ACK}. Note that the gap between ACK TX power and NACK TX power increases greatly as the required Prob{erroneous decoding of DTX to ACK} decreases. It should be also noted that the required NACK TX power is very small because the decision/determination threshold is biased to the ACK position to satisfy the restriction on the Prob{erroneous decoding of DTX to ACK}.

Table 2 shows the difference in the power requirements between ACK and NACK signals when UE is in soft handover. The same threshold as in a non-handover case is used because the threshold value is related to the uplink interference since it is required to consider DTX case.

TABLE 2

Power requirements in the ACK/NACK transmission in SHO:

| Prob{erroneous decoding of DTX to ACK} | $<10^{-1}$ | $<10^{-2}$ | $<10^{-3}$ |
|---|---|---|---|
| ACK TX power relative to UL DPCCH | 6 dB | 9.5 dB | 11 dB |
| NACK TX power relative to UL DPCCH | 3.5 dB | −4.5 dB | −14.5 dB |
| ACK TX power − NACK TX power | 2.5 dB | 14 dB | 25.5 dB |

As shown in Table 2, required power for both the ACK and the NACK increases in a soft handover case since the uplink ACK/NACK signal can suffer a deep fading when the transmitter (e.g., a Node-B) serving HSDPA does not control the power of the response channel (e.g., an uplink DPCCH).

It should be also noted that the increase in the ACK power is much larger than the increase in the NACK power so that the difference in the required powers between ACK and NACK is larger than in a non-handover case. This is because the decision threshold is biased to the ACK constellation. Deep fading only can't make the received NACK signal cross the threshold, but the received ACK signal can cross the threshold by deep fading without phase error or interference. Hence, performance of the ACK decoding is degraded more than that of the NACK decoding in a soft handover case.

The present invention has been accepted by the standardization committee for IMT-2000, which is disclosed in Technical Specification 3GPP TS 25,214 v5.1.0 (2002-06), whose entire disclosure is incorporated herein by reference.

In this Technical Specification, the present invention is referred to as $\Delta_{ACK}$ and $\Delta_{NACK}$ due to the fact that uplink power level is based on the relative distance of UE on mobile station to the base station (hereinafter "BS"). As shown in FIG. 3, after the BS sends the data packet, the UE sends either an ACK signal with a transmission power level of $\Delta_{ACK}$ relative to the uplink power level or a NACK signal with a transmission power level of $\Delta_{NACK}$ relative to the uplink power level. The $\Delta_{ACK}$ and/or $\Delta_{NACK}$ employ the same novel feature of the preferred embodiment of the present invention as described above. If the BS is receiving data packets from the UE, the present invention is applicable to BS.

1 bit ACK/NACK indication is used for a HARQ Acknowledgment. The acknowledgment bit is repetition coded to 10 bits and transmitted in one slot. When an HS-DPCCH is active, the relative power offset ΔHS-DPCCH between the DPCCH and the HS-DPCCH slot is as follows for HS-DPCCH slot carry HARQ Acknowledgment:
1. $\Delta_{HS\text{-}DPCCH}=\Delta_{ACK}$ if the corresponding HARQ Acknowledgment is equal to 1.
2. $\Delta_{HS\text{-}DPCCH}=\Delta_{NACK}$ if the corresponding HARQ Acknowledgment is equal to 0.

The values for $\Delta_{ACK}$ and $\Delta_{NACK}$ are set by higher layers.

Therefore, by adjusting the transmission power of the response signal according to the content of the response signal, the present invention prohibits that one of the ACK and the NACK is transmitted with a transmission power of relative larger power more than actually required, and reduces unnecessary power consumption.

As mentioned above, if the transmission power of the ACK signal is same that of the NACK signal when the ACK/NACK signals are transmitted in the automatic repeat request (ARQ) system, the ACK/NACK signals should be transmitted with a larger one among the required transmission power of the ACK signal and the required transmission power of NACK signal when the required transmission powers are different to each other. To the contrary, according to the present invention, since the ACK/NACK signals can be transmitted with required transmission power in accordance with transmission power required in each signal by differently adjusting the transmission powers of the ACK signal and the NACK signal, the power consumption required in the transmission of the ACK/NACK signals can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for a user equipment (UE) to transmit a feedback signal in a communication system, the method comprising:
   receiving data from a base station; and
   transmitting the feedback signal to the base station via a specific channel with a specific transmission power, wherein a type of the feedback signal is an acknowledgement (ACK) when the data from the base station is received without error, and the type of the feedback signal is a negative acknowledgement (NACK) when the data from the base station is received with error, and
   wherein the specific transmission power for the specific channel is determined according to whether the type of the feedback signal is the ACK or the NACK.

2. The method of claim 1, wherein the specific transmission power for transmitting the NACK is smaller than the specific transmission power for transmitting the ACK.

3. The method of claim 1, wherein the feedback signal is transmitted with a first power offset for the ACK and a second power offset for the NACK relative to a transmission power of an uplink Dedicated Physical Control Channel (DPCCH).

4. The method of claim 1,
wherein transmitting the feedback signal via the specific channel is performed when the type of the feedback signal is the ACK or the NACK, and
wherein the type of the feedback signal is a discontinuous transmission (DTX) when the feedback signal is not transmitted via the specific channel.

5. The method of claim 4, wherein the base station receiving the feedback signal determines the DTX as the NACK.

6. The method of claim 1, wherein the communication system is a High Speed Downlink Packet Access (HSDPA) system, and the specific channel is a High Speed Dedicated Physical Control Channel (HS-DPCCH).

* * * * *